3,121,097
MAGNESIUM DECABORANE TETRAHYDROFURAN ADDUCT

John W. Ager, Jr., Buffalo, N.Y., assignor to Olin Mathieson Chemical Corporation, a corporation of Virginia
No Drawing. Filed Sept. 30, 1958, Ser. No. 764,451
2 Claims. (Cl. 260—346.1)

This invention relates to preparation of the new adduct, magnesium decaborane tetrahydrofuran, $$Mg(B_{10}H_{13})_2 \cdot C_4H_8O$$

More in particular, this invention relates to the preparation of the magnesium decaborane tetrahydrofuran adduct by heating a tetrahydrofuran solution of a magnesium decaborane ammonia adduct of the kind described in my copending application Serial No. 764,455, filed of even date herewith. That copending application describes the preparation of magnesium decaborane ammonia adducts by the direct reaction of magnesium and decaborane while they are dissolved in liquid ammonia at a temperature of from −60° C. to +40° C., elevated pressures being employed when needed to keep the ammonia in liquid phase.

The magnesium decaborane adducts prepared by the method of this invention can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. These magnesium decaborane adducts when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following example illustrates the invention.

EXAMPLE

In this example, 2 grams (0.0165 mole) of decaborane and 0.17 gram (0.0071 mole) of magnesium turnings were placed in a 250 ml. three-neck flask. The flask was connected to a fraction cutter of 100 ml. capacity and a "Dry-Ice" cold finger condenser. The apparatus was swept with nitrogen and the reactants heated to incipient melting of the decaborane. After the mixture had cooled to room temperature, 50 ml. of ammonia gas was condensed in the graduated tube of the fraction cutter. Then the liquid ammonia was transferred to the reaction flask which was cooled with "Dry-Ice." The color of the decaborane magnesium mixture immediately changed to yellow. Effervescence and solution of the magnesium proceeded for approximately one hour in the presence of the refluxing ammonia. Then the ammonia was allowed to evaporate. A dry, white solid residue remained in the flask. No unreacted magnesium was visible.

The white solid residue was washed with ether, filtered and then dissolved in about 25 ml. of tetrahydrofuran. Ammonia evolved, and the tetrahydrofuran became yellow. A white solid was also obtained. This mixture was refluxed for a few minutes until ammonia evolution ceased and the tetrahydrofuran distilled. The yellow product was washed with ether and dried.

An infrared spectrum of the yellow product showed practically no similarity to that of the magnesium decaborane ammonia adduct. The spectrum contained strong OH bands and appeared to have some basic decaborane structure. Two elemental analyses of the product showed that it contained 44.3, 44.0 percent boron, 4.15, 3.94 percent magnesium, 13.13, 12.47 percent carbon and 9.50, 9.79 percent hydrogen. These analyses indicate one tetrahydrofuran molecule to two decaborane molecules, $Mg(B_{10}H_{13})_2 \cdot C_4H_8O$.

The boron-containing solid material produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing these magnesium decaborane products, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain a binder such as an artificial resin, generally of the urea-formaldehyde or phenol-formaldehyde type, or an artificial rubber like substance, the function of the binder being to give the propellant mechanical strength and at the same time improve its burning characteristics. Thus, in manufacturing a suitable propellant proper proportions of finely divided oxidizer and finely divided magnesium decaborane product can be admixed with a suitable binder, the proportions being such that the amount of the binder is about 5 to 10 percent by weight, based upon the weight of the oxidizer and the magnesium decaborane product. The ingredients are thoroughly mixed and following this the mixture is molded into the desired shape, as by extrusion. Thereafter, the binder can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the preparation of a magnesium decaborane tetrahydrofuran adduct which comprises forming a tetrahydrofuran solution of a magnesium decaborane ammonia adduct, heating the solution until ammonia evolution substantially ceases, and separating a magnesium decaborane tetrahydrofuran adduct from the resulting solution.

2. An adduct of the formula $Mg(B_{10}H_{13})_2 \cdot C_4H_8O$.

No references cited.